(12) United States Patent
Chiu

(10) Patent No.: US 6,992,470 B1
(45) Date of Patent: Jan. 31, 2006

(54) SWITCHING POWER SUPPLY SYSTEM FOR AUTOMATICALLY REGULATING CIRCUIT OPERATING FREQUENCY AND METHOD THEREOF

(75) Inventor: Yung-Cheng Chiu, Taipei (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/879,004

(22) Filed: Jun. 30, 2004

(51) Int. Cl.
G05F 1/44 (2006.01)
(52) U.S. Cl. .................................... 323/284
(58) Field of Classification Search ............... 323/271, 323/282, 284, 285, 351
See application file for complete search history.

(56) References Cited

U.S. PATENT DOCUMENTS 6,181,123 B1 * 1/2001 Jou et al. ................ 323/351
6,204,649 B1 * 3/2001 Roman .................... 323/282
6,294,904 B1 * 9/2001 Hirst ........................ 323/283
2005/0052249 A1 * 3/2005 Gan et al. ................ 331/23

* cited by examiner

Primary Examiner—Gary L Laxton
(74) Attorney, Agent, or Firm—Troxell Law Office, PLLC

(57) ABSTRACT

The invention describes a switching power supply system for automatically regulating an operating frequency and the method. The switching power supply system has a sensing and monitoring unit connected to the computer system for detecting the operating status of the computer system and outputting a detection value, a setting unit for setting a trigger condition value, a storage unit connected to the setting unit for storing the trigger condition value, a comparator unit connected to the storage unit and the sensing and monitoring unit for comparing the detection value with the trigger condition value and outputting a comparison result signal, and a PWM switching frequency regulator unit connected to the comparator unit and the converter for receiving the comparison result signal and regulating the operating frequency of the pulse width modulation so that a converter can supply power to the computer system more efficiently.

13 Claims, 2 Drawing Sheets

SWITCHING POWER SUPPLY SYSTEM FOR AUTOMATICALLY REGULATING CIRCUIT OPERATING FREQUENCY AND METHOD THEREOF

BACKGROUND OF THE INVENTION

1. Field of the Invention

The present invention relates to a switching power supply system for automatically regulating a circuit operating frequency and the method thereof, and particularly, to a switching power supply system adapted to a computer system and capable of automatically regulating a circuit operating frequency, and the method thereof.

2. Description of the Related Art

Referring to FIG. 1, a schematic block diagram of a conventional switching power supply system is shown. The switching power supply system employs pulse width modulation (PWM) technology to control a power switch (not shown) in a DC converter 11 and supplies power to the system through a filter network 13.

According to the pulse width modulation (PWM) technology, an oscillator circuit 17 provides a signal with constant frequency to a pulse width modulation unit 15. Meanwhile, a comparator 12 detects the DC voltage at the output terminal. If the voltage obtained by dividing the DC voltage at the output terminal through a voltage divider network 14 becomes lower than a reference voltage 16, that is, if the output loading becomes heavy, then output square waves from the pulse width modulation unit 15 will be widened, which means a duty cycle of the power switch (not shown) will be increased. Thereby, compensation for the output voltage is provided to bring the output voltage back to the original rating value and thus the output voltage can be stabilized.

Similarly, if the loading becomes low, then the comparator 12 will detect that the voltage obtained by dividing the DC voltage at the output terminal through the voltage divider network 14 is greater than the reference voltage 16, and therefore the duty cycle of the output square waves from the pulse width modulation unit 15 will be reduced, which means the duty cycle of the power switch will be reduced. Thereby, the output DC voltage will be lowered to the original rating value and thus stabilized. In this circuit, the operating frequency of the power switch (not shown) does not vary with the change of the duty cycle. In other words, the circuit operating frequency always stays constant.

At present, the pulse width modulation (PWM) technology is utilized in a computer system to supply power required for the operation of a central processing unit (CPU). For the reason described above, operating frequency from the pulse width modulation PWM in a power supply system for the central processing unit (CPU) always stays constant and cannot be changed after the design is made.

Consequently, once the design is complete, the operating frequency from the pulse width modulation PWM cannot be changed in response to any current load variations resulting from execution of any software by any type of central processing unit (CPU), environmental variations inside/outside the housing and voltage variations caused by the power supply or by the load. Therefore, it is impossible to contribute anything to operating efficiency enhancement of pulse width modulation PWM, reduction in switching loss, suppression of system temperature, improvement of sawtooth current and decrease in peak-to-peak ripple voltage. Accordingly, the output voltage and the whole system are unstable, and the efficiency of the components cannot be maximized, which seriously impacts the performance of the computer.

SUMMARY OF THE INVENTION

In view of the above, the present invention discloses a switching power supply system for automatically regulating a circuit operating frequency and the method thereof to provide a switching power supply system and a method for dynamically increasing or decreasing an operating frequency of a computer system. The present invention has excellent effects on operating efficiency enhancement of pulse width modulation PWM, reduction in switching loss, suppression of system temperature, improvement of sawtooth current and decrease in peak-to-peak ripple voltage.

In the present invention, a sensing and monitoring unit connected to the computer system detects a model number of the central processing unit (CPU), current consumption of the central processing unit (CPU), temperature change inside/outside the housing or at a predetermined point, voltage variations and load variations in the computer system and generates a detection value. The detection value is then transmitted to a comparator unit associated with the sensing and monitoring unit. Then, the comparator unit compares the detection value with a trigger condition value stored in a storage unit and outputs a comparison result signal to a PWM switching frequency regulator unit. The trigger condition value stored in the storage unit is obtained from a setting operation by a setting unit.

In the above description, the PWM switching frequency regulator unit dynamically increases or decreases the operating frequency of the pulse width modulation PWM based on the comparison result signal so that the converter can supply power to the computer system more efficiently.

In the switching power supply system for automatically regulating a circuit operating frequency and the method thereof according to the present invention, through dynamically monitoring the operating status change of the computer system by the sensing and monitoring unit, when the status change exceeds a pre-set trigger value, the PWM switching frequency regulator unit can dynamically increase or decrease the operating frequency of the pulse width modulation PWM based on the comparison result signal so that the converter can efficiently supply power to the computer system in response to the changing environment.

BRIEF DESCRIPTION OF THE DRAWINGS

Features and advantages of the present invention will be fully understood from the detailed description to follow when taken in conjunction with the embodiment as illustrated in the accompanying drawings, which are to be considered in all respects as illustrative and not restrictive, wherein.

DETAILED DESCRIPTION OF PREFERRED EMBODIMENTS

Figure 1:
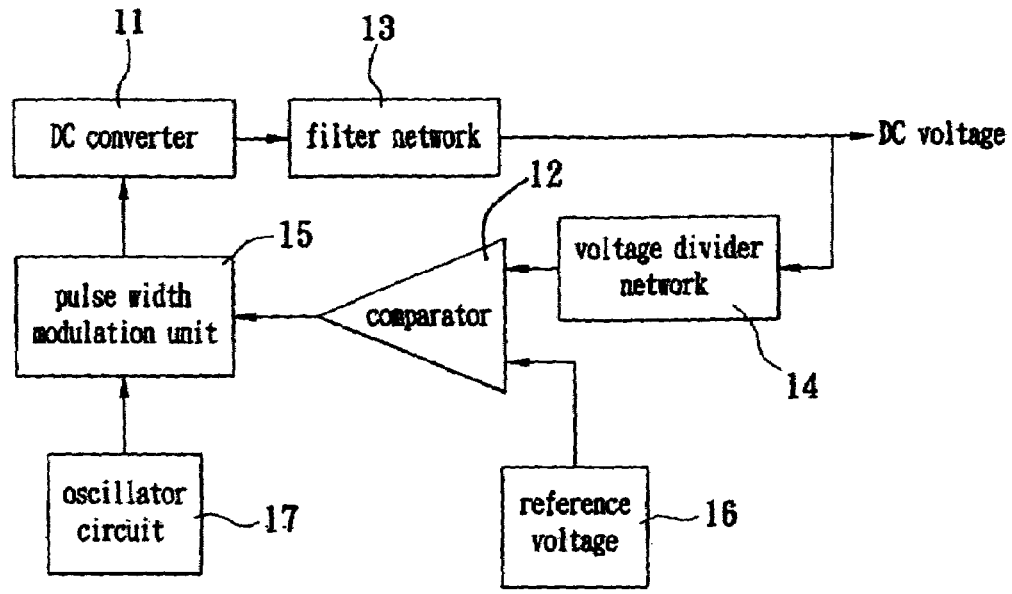
FIG. 1 schematically illustrates a block diagram of the conventional switching power supply system.
Figure 2:
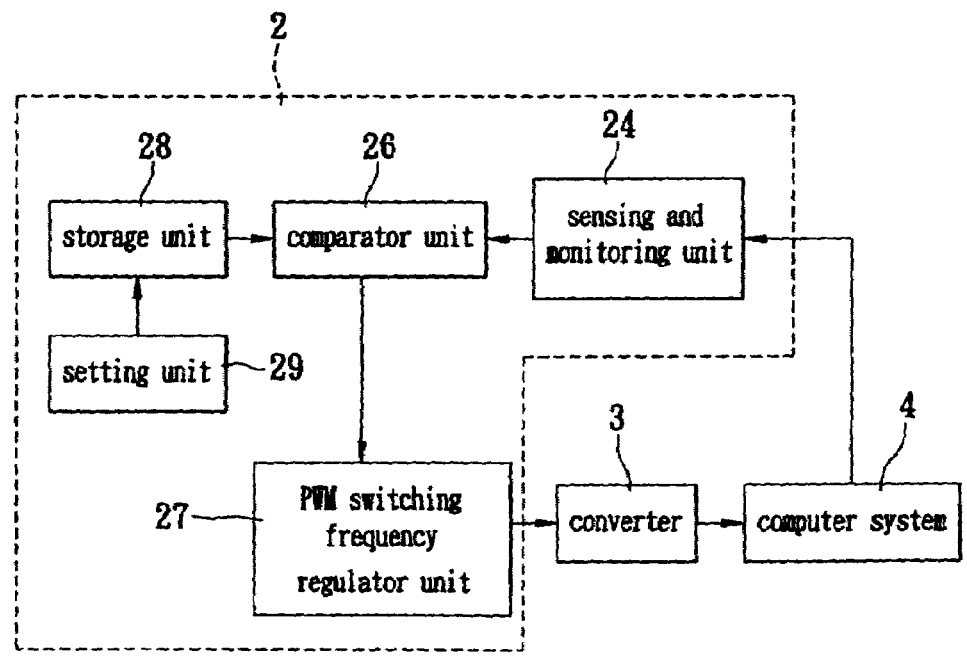
FIG. 2 schematically illustrates a block diagram of the switching power supply system for automatically regulating a circuit operating frequency according to the present invention.

Referring to FIG. 2, a schematic block diagram of the switching power supply system for automatically regulating a circuit operating frequency according to the present invention is shown. The switching power supply system for automatically regulating a circuit operating frequency 2, which is used for regulating an operating frequency of a converter 3 to supply a DC power to a computer system 4, includes a sensing and monitoring unit 24, a comparator unit 26, a PWM switching frequency regulator unit 27, a storage unit 28 and a setting unit 29.

Referring again to FIG. 2, the sensing and monitoring unit 24, which is connected to the computer system 4, detects an operating status of the computer system 4 and outputs a detection value. The setting unit 29, which is connected to the storage unit 28, is used for setting a trigger condition value and storing the trigger condition value into the storage unit 28. In the above description, the trigger condition value serves as a trigger condition value for regulating the operating frequency. The comparator unit 26, which is connected to the sensing and monitoring unit 24 and the storage unit 28 to receive the detection value from the sensing and monitoring unit 24 and the trigger condition value stored in the storage unit 28, carries out a comparison operation and outputs a comparison result signal. The PWM switching frequency regulator unit 27, which is connected to the comparator unit 26 and to the converter 3, receives the comparison result signal from the comparator unit 26 and dynamically and automatically increases or decreases the operating frequency of the pulse width modulation PWM based on the comparison result signal so that the converter 3 can supply power to the computer system 4 more efficiently.

Referring again to FIG. 2, the sensing and monitoring unit 24 includes a sensor (not shown) and a monitoring module (not shown). The sensor may be a voltage sensor, a current sensor, a temperature sensor, a load sensor or the like. The monitoring module may be a voltage monitoring module, a current monitoring module, a temperature monitoring module, a load monitoring module or the like. The sensing and monitoring unit 24 is connected to a key point (not shown) in the computer system 4 through the sensor so as to detect the operating status of the computer system 4. The monitoring module cooperates with the sensor so as to monitor dynamically the voltage, current, temperature or program load in the computer system 4 and then dynamically delivers an indication of the status change to the system.

In the above description, the sensing and monitoring unit 24 may consist of a combination of at least one sensor (not shown) and at least one monitoring module (not shown). The sensor may be a voltage sensor, a current sensor, a temperature sensor, a load sensor or the like. The monitoring module may be a voltage monitoring module, a current monitoring module, a temperature monitoring module, a load monitoring module or the like. The sensing and monitoring unit 24 is connected to multiple key points in the computer system 4 through those sensors so as to detect the environmental changes for the computer system 4 with higher sensitivity. The monitoring modules cooperate with the corresponding sensors so as to monitor dynamically the voltage, current, temperature and program load in the computer system 4 and then dynamically deliver indications of these status changes to the system.

Referring again to FIG. 2, the trigger condition value may be set through the setting unit 29 by a user upon turning on the system. Moreover, a combination of multiple trigger condition values may be set in accordance with different demands. The trigger condition values are stored in the storage unit 28. In the subsequent process, the comparator unit 26 in the system compares the trigger condition values, which are set by the user, with the detection values, which indicate the system status and are output from the sensors, to determine whether an increase or an decrease in the operating frequency of the pulse width modulation (PWM) is to be carried out.

Under any operation system, when the computer system 4 is requested to run a heavy load program or a program that is to be executed for a long period of time, the system automatically increases the operating frequency of the pulse width modulation (PWM) according to the demand. When the system returns to a normal state or when the program terminates, the PWM operating frequency will be regulated back to the original operating frequency. During the operation, it is not required to employ any software for switching the frequency, nor is it required to reset the computer system 4. No programs being run on the computer will be adversely affected by the switching process.

The invention may employ a single temperature monitor comprised of a temperature sensor and a temperature monitoring module. When temperature of a power switch MOS in the pulse width modulation PWM for controlling the converter 3 is overheated, the system will automatically decrease the operating frequency of the pulse width modulation PWM so that the temperature of the power switch MOS can be lowered. When the temperature of a power switch MOS in the pulse width modulation PWM for controlling the converter 3 falls below a pre-set temperature, the pulse width modulation PWM will be operated at a higher switching frequency. The present invention is advantageous because of its short response time and high compatibility. In addition, stability and efficiency can be maximized since modification or setting of the sensors is allowed to be carried out under any type of operation systems without resetting the computer system 4.

Figure 3:
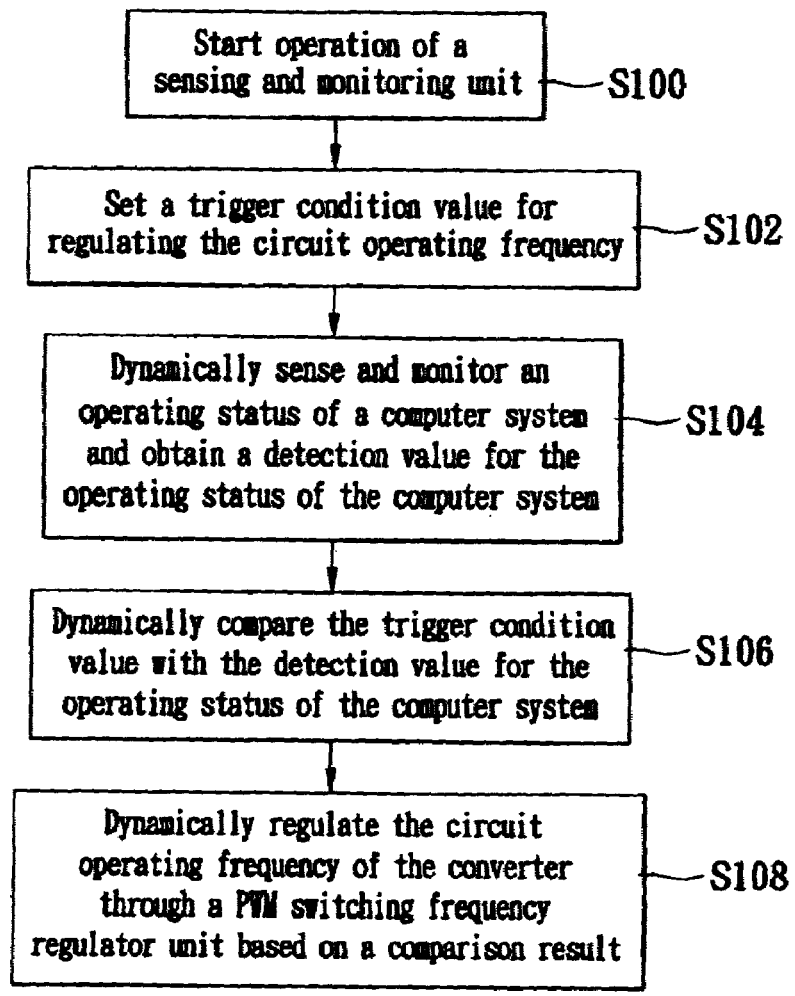
FIG. 3 is a flow chart for explaining the method for automatically regulating a circuit operating frequency according to the present invention.

Referring to FIG. 3, a flow chart for explaining the method for automatically regulating a circuit operating frequency according to the present invention is shown. The method for automatically regulating a circuit operating frequency of the invention comprises the steps described as follows. First, operation of a sensing and monitoring unit is started (S100). Next, a trigger condition value is set for regulating the circuit operating frequency (S102). Then, an operating status of a computer system is dynamically sensed and monitored, and a detection value is obtained for the operating status of the computer system (S104). Further, the trigger condition value is dynamically compared with the detection value for the operating status of the computer system (S106). Finally, the circuit operating frequency of the converter is dynamically regulated through a PWM switching frequency regulator unit based on a comparison result S108.

Referring to both FIG. 2 and FIG. 3, the sensing and monitoring unit 24 includes a sensor (not shown) and a monitoring module (not shown). The sensor may be a voltage sensor, a current sensor, a temperature sensor, a load sensor or the like or a combination of any of these sensors. Each sensor cooperates with a corresponding monitoring module to monitor dynamically the status of the computer system 4 and accordingly output a detection value. The monitoring module may be a voltage monitoring module, a current monitoring module, a temperature monitoring module, a load monitoring module or the like.

In the above step of trigger condition setting, the trigger condition value can be set as a trigger condition value for a single sensor, or it can also be set as at least one trigger condition value for at least on sensor. In addition, the trigger condition value can be set as a factory default value and stored in the storage unit 28 of the computer system before shipping to customers, or it can also be set to a desired value by a user and stored in the storage unit 28 of the computer system upon turning on the computer system.

In the step of dynamically regulating the operating frequency of the converter, the system compares the trigger condition value set by the user with the detection value from the sensing and monitoring unit 24 to determine how to regulate the operating frequency of the pulse width modulation PWM; that is, whether the operating frequency of the pulse width modulation PWM is to be increased or decreased. Certainly, if the operating status does not exceed the pre-set trigger condition value, then the operating frequency of the pulse width modulation PWM is maintained at a constant rate.

As described above, the switching power supply system for automatically regulating a circuit operating frequency and the method thereof according to the present invention provide a switching power supply system and a method for dynamically increase or decrease an operating frequency of the computer system 4. The present invention has excellent effects on operating efficiency enhancement of pulse width modulation PWM, reduction in switching loss, suppression of system temperature, improvement of sawtooth current and decrease in peak-to-peak ripple voltage.

While the present invention has been described with reference to the detailed description and the drawings of the preferred embodiment thereof, it is to be understood that the invention should not be considered as limited thereby. Various modifications and changes could be conceived of by those skilled in the art without departing from the scope of the present invention, which is indicated by the appended claims.

What is claimed is:

1. A switching power supply system for automatically regulating a circuit operating frequency of a converter to supply a DC power to a computer system, comprising:
    a sensing and monitoring unit connected to said computer system for detecting an operating status of said computer system and outputting a detection value;
    a setting unit for setting trigger condition value to regulate the circuit operating frequency;
    a storage unit connected to said setting unit for storing said trigger condition value;
    a comparator unit connected to said storage unit and to said sensing and monitoring unit for comparing said detection value with said trigger condition value and outputting a comparison result signal; and
    a PWM switching frequency regulator unit connected to said comparator unit and to said converter for receiving said comparison result signal and regulating the circuit operating frequency of said converter based on said comparison result signal.

2. The switching power supply system for automatically regulating a circuit operating frequency of claim 1, wherein said sensing and monitoring unit includes at least one sensor and at least one monitoring module.

3. The switching power supply system for automatically regulating a circuit operating frequency of claim 2, wherein said sensor is any combination of a voltage sensor, a current sensor, a temperature sensor and a load sensor.

4. The switching power supply system for automatically regulating a circuit operating frequency of claim 2, wherein said monitoring module is any combination of a voltage monitoring module, a current monitoring module, a temperature monitoring module and a load monitoring module.

5. The switching power supply system for automatically regulating a circuit operating frequency of claim 1, wherein said sensing and monitoring unit includes a sensor and a monitoring module.

6. The switching power supply system for automatically regulating a circuit operating frequency of claim 5, wherein said sensor is a voltage sensor, a current sensor, a temperature sensor or a load sensor.

7. The switching power supply system for automatically regulating a circuit operating frequency of claim 5, wherein said monitoring module is a voltage monitoring module, a current monitoring module, a temperature monitoring module or a load monitoring module.

8. A method for automatically regulating a circuit operating frequency of a converter to supply a DC power to a computer system, comprising the steps of:
    starting operation of a sensing and monitoring unit;
    setting a trigger condition value for regulating the circuit operating frequency;
    dynamically sensing and monitoring an operating status of said computer system and obtaining a detection value for the operating status of said computer system;
    dynamically comparing said trigger condition value with said detection value for the operating status of said computer system; and
    dynamically regulating the circuit operating frequency of said converter through a PWM switching frequency regulator unit based on a comparison result.

9. The method for automatically regulating a circuit operating frequency of claim 8, wherein the step of setting said trigger condition value comprises setting a single trigger condition value for a single sensor.

10. The method for automatically regulating a circuit operating frequency of claim 8, wherein the step of setting said trigger condition value comprises setting at least one trigger condition value for at least one sensor.

11. The method for automatically regulating a circuit operating frequency of claim 8, wherein the step of setting said trigger condition value comprises setting and storing said trigger condition value in a storage unit of said computer system as a factory default value.

12. The method for automatically regulating a circuit operating frequency of claim 8, wherein the step of setting said trigger condition value comprises setting said trigger condition value by a user and storing said trigger condition value in a storage unit of said computer system upon turning on said computer system.

13. The method for automatically regulating a circuit operating frequency of claim 8, wherein the step of dynamically regulating the circuit operating frequency of said converter includes a regulation of decrease or increase in the operating frequency.

* * * * *